United States Patent
Chiang et al.

(10) Patent No.: US 10,623,456 B2
(45) Date of Patent: Apr. 14, 2020

(54) DEVICE SERVICE CAPABILITY DISCOVERY

(71) Applicant: T-Mobile USA, Inc., Bellevue, WA (US)

(72) Inventors: Hsin-Fu Henry Chiang, Bellevue, WA (US); Yasmin Karimli, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 168 days.

(21) Appl. No.: 15/669,394

(22) Filed: Aug. 4, 2017

(65) Prior Publication Data

US 2019/0044984 A1 Feb. 7, 2019

(51) Int. Cl.
| H04L 29/06 | (2006.01) |
| H04L 29/08 | (2006.01) |
| H04N 7/14 | (2006.01) |

(52) U.S. Cl.
CPC ........ *H04L 65/403* (2013.01); *H04L 65/1006* (2013.01); *H04L 65/1016* (2013.01); *H04L 65/1069* (2013.01); *H04L 65/1089* (2013.01); *H04L 67/02* (2013.01); *H04L 67/303* (2013.01); *H04L 69/24* (2013.01); *H04N 7/147* (2013.01)

(58) Field of Classification Search
CPC .............. H04L 65/403; H04L 65/1006; H04L 65/1069; H04L 65/1089; H04L 65/303; H04N 7/147
USPC ........................................................ 709/204
See application file for complete search history.

(56) References Cited

U.S. PATENT DOCUMENTS

| 8,401,004 | B2 * | 3/2013 | Song | H04L 65/1089 |
| | | | | 370/352 |
| 9,218,033 | B1 * | 12/2015 | Roy | H02J 4/00 |
| 9,313,164 | B2 | 4/2016 | Suryavanshi | |
| 9,503,484 | B2 | 11/2016 | Zisimopoulos et al. | |
| 9,826,072 | B1 * | 11/2017 | Filart | H04L 69/22 |
| 2012/0092811 | A1 * | 4/2012 | Chapel | H04L 12/10 |
| | | | | 361/622 |

(Continued)

FOREIGN PATENT DOCUMENTS

EP 2843907 A1 3/2015

OTHER PUBLICATIONS

The PCT Search Report and Written Opinion dated Nov. 7, 2018 for PCT Application No. PCT/US2018/042846, 13 pages.

*Primary Examiner* — Kristie D Shingles
(74) *Attorney, Agent, or Firm* — Lee & Hayes, P.C.

(57) ABSTRACT

Systems, devices, and techniques described herein are directed to device service capability discovery. An initiating user equipment (UE) can transmit a request to establish a communication session (e.g., a voice call, a video call, etc.) with a destination UE. The initiating UE can also transmit a request for capability information associated with the destination UE. The destination UE can provide capability information associated with features beyond those required for the communication session. Thus, capability information for a plurality of features can be determined in parallel with establishing a communication between an initiating UE and a destination UE. In some cases, an initiating UE can receive an error message in response to signaling to establish the communication session, in which case the initiating UE can update capability information associated with the destination UE.

20 Claims, 6 Drawing Sheets

(56) References Cited

U.S. PATENT DOCUMENTS

2013/0173185 A1\* 7/2013 Witter ............ G06Q 10/063118
  702/58
2014/0372557 A1\* 12/2014 Buckley ................ H04L 67/104
  709/217
2016/0345226 A1 11/2016 Keller et al.
2018/0324235 A1\* 11/2018 Mufti .................. H04L 65/1006

\* cited by examiner

DEVICE SERVICE CAPABILITY DISCOVERY

BACKGROUND

Telecommunication networks often include functionality for devices to exchange information regarding the capabilities of devices on the network. For example, one known method uses a proxy server that provides a central repository for such information. Another method is for a first device to query another device and request such information. However, prior art implementations have suffered from excessive overhead (e.g., computational overhead, network traffic overhead, etc.), reliability of data (e.g., stale data), and/or security concerns.

For example, a proxy server managing device information must receive the information from devices at regular intervals and provide updates to subscribing devices. However, the exchange of information adds significant overhead to the network in terms of signaling and network traffic, and often the data at the proxy server is outdated or does not accurately reflect capabilities of devices. With respect to querying devices directly to request capability information (e.g., using a SIP OPTIONS command), prior art methods can present security concerns by allowing devices access to information from remote devices without the remote device giving permission or being aware of such data query. Further, querying methods often do not provide a complete view of the capabilities of a device.

Without accurate capability information for devices, communications between devices can be suboptimal. For example, a first device can attempt to initiate a video communication with a second device, while the second device may not be capable of facilitating the video communication, in which case, a request from the first device can be refused. In another example in which a video communication can be a preferred communication type, a first device can attempt to initiate a voice communication with a third device, without knowing that the third device is capable of facilitating a video communication. Thus, in both examples, a lack of capability information can lead to suboptimal outcomes.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
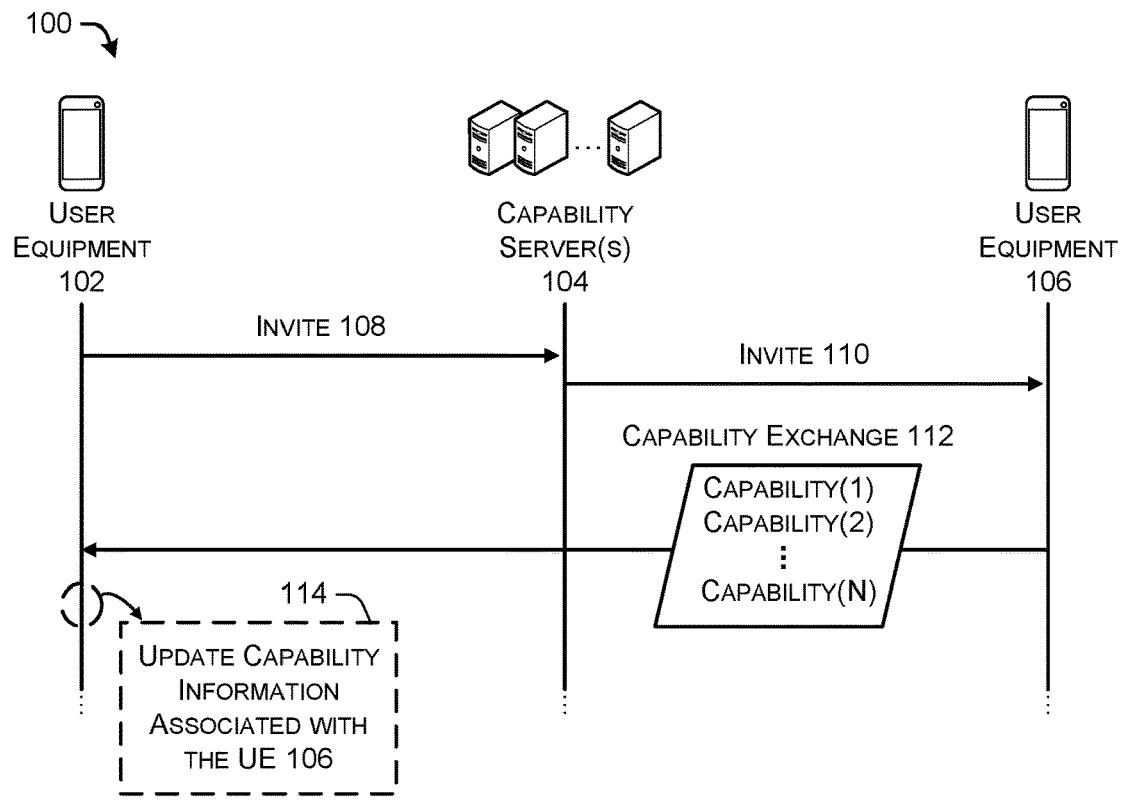
FIG. 1A is a diagram illustrating example signaling between a user equipment (UE), a capability server, and a UE to discover device capabilities, as described herein.

The systems, devices, and techniques described herein are directed to discovering capabilities of devices in a network. As a user equipment (UE) initiates a communication session (e.g., a voice call, a video call, etc.), the signaling procedure can include transmitting a communication invite for the particular type of communication session from the initiating UE to the destination UE. In response, the destination UE can provide a capability exchange including capability information associated with one or more capabilities of the destination UE. Further, although the communication invite can be directed to the particular type of communication (e.g., the voice call), the destination UE can respond with capability information of the destination UE including voice call capability, video call capability, rich communication services (RCS) capability, real time text (RTT) capability, short message service/multimedia messaging service (SMS/MMS) capability, encryption capability, codec capability, and the like. Thus, capability information for a plurality of features can be determined in parallel with establishing a communication between an initiating UE and a destination UE.

In some cases, a UE can initiate a communication and receive an error message in response, such as a HTTP 404 error, indicating that a destination UE was not found. In such a case, the initiating UE can receive the error message and update capability information associated with the destination UE. In some instances, the operations can include associating a confidence level with the capability information, as the state of the destination UE can change over time.

Further, in some cases, the initiating UE can provide capability information to the destination UE as well. For example, the initiating UE can provide capability information along with the communication invite, following the communication invite, in response to the capability exchange received from the destination UE, in response to a request from the destination UE, or at any other time before, during, or after the communication session. As discussed herein, the capability information can include capability information corresponding to features in addition to those used by or involved with a current communication invite or communication session.

In some instances, the systems, devices, and techniques discussed herein can include updating an application, address book, or user interface of the initiating UE and/or the destination UE to indicate capabilities of the initiating UE and/or destination UE, respectively. That is, a user interface can display information, such as via icons, tables, lists, etc., indicating the capabilities of a destination UE and/or the capabilities not supported by the destination UE. Thus, a user can quickly understand the capabilities associated with a destination UE (or associated with a user profile associated with the destination UE) to optimally choose a communication method.

Further, the systems, devices, and techniques discussed herein can implement other capability discovery techniques, in accordance with protocols supported by various networks. For example, a UE can publish or otherwise provide capability information to a capability server, whereby another UE can subscribe to the capability information to determine capability information associated with the devices. The subscribing device can receive updates at any time and for any duration. In some examples, a publishing UE can provide updated capability information as capabilities are added or removed from the UE, and in some instances, the publishing UE can receive a query from the capability server requesting capability information. The capability server can push updated capability information to subscribing UEs, and/or can provide capability information in response to receiving a request.

In other examples, the systems, devices, and techniques herein can implement the SIP (session initiation protocol) OPTIONS to determine a capability of a UE without establishing a communication.

Further, the systems, devices, and techniques discussed herein can implement a plurality of discovery methods for compatibility with various networks, and can select a discovery method based on an indication of the discovery method supported by a particular network.

The systems, devices, and techniques described herein provide advances over prior art systems that are limited to the background discovery techniques discussed above. For example, prior art systems utilizing only a proxy server that provides a central repository for capability information can suffer from stale information, as the capabilities of devices can change faster than can be updated at the central repository. Further, increasing a frequency of reporting and disseminating information can create a burden on network transmission capacity, and can be computationally intensive. Further, prior art querying methods to determine device capabilities can introduce security concerns or privacy concerns by allowing a device to query a destination device. Thus, the systems, devices, and techniques described herein can improve a functioning of a network by reducing network congestion and computational overhead due to centralized device management. Further, exchanging capability information in the context of communication signaling increases security and/or privacy by limiting the amount of information that can be obtained from a device without alerting a user. In some cases, providing more complete capability information can reduce overall network signaling by consolidating transmissions, and can improve a user experience by informing users and user equipment more accurately that device capabilities are available for a communication between devices. These and other improvements to the functioning of a computer and network are discussed herein.

The systems, devices, and techniques described herein can be implemented in a number of ways. Example implementations are provided below with reference to the following figures.

FIG. 1A is a diagram illustrating example signaling 100 between a user equipment (UE) 102, a capability server 104, and a UE 106 to discover device capabilities, as described herein. In some instances, the capability server 104 can correspond to and/or can represent an originating network associated with a communication or a terminating network associated with a communication.

In accordance with various embodiments described herein, the terms "user equipment (UE)," "wireless communication device," "wireless device," "communication device," "mobile device," and "client device," can be used interchangeably herein to describe any UE (e.g., the UEs 102 or 106) that are capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future IP-based network technology or evolution of an existing IP-based network technology.

The UE 102 and 106 can be implemented as any suitable type of computing device configured to communicate over a wireless network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an in-vehicle (e.g., in-car) computer, and/or any similar mobile device, as well as situated computing devices including, without limitation, a television (smart television), set-top-box (STB), desktop computer, and the like. Additional details of the UE 102 and 106 are discussed below in connection with FIG. 2.

In general, a user can utilize the UE 102 to communicate with other users and associated UEs via an IP Multimedia Subsystem (IMS) core (sometimes referred to as the "IMS core network," the "IMS network," the "Core Network (CN)," or the "IM CN Subsystem"). IMS is an architectural framework defined by the $3^{rd}$ Generation Partnership Project (3GPP) for delivering Internet Protocol (IP) multimedia to a UE, such as the UEs 102 or 106. The IMS core can be maintained and/or operated by one or more service providers, such as one or more wireless carriers ("carriers"), that provide IMS-based services to users who are associated with UEs, such as the UEs 102 and 106. For example, a service provider can offer multimedia telephony services that allow a user to call or message other users via the IMS core using his/her UE. A user can also utilize an associated UE to receive, provide, or otherwise interact with various different IMS-based services by accessing the IMS core. In some instances, the capability server(s) 104 can represent an IMS network to initiate and facilitate communications. It is to be appreciated that any number of IMS nodes can be include in the IMS network.

Accordingly, an operator of the IMS core can offer any type of IMS-based service, such as, telephony services, emergency services (e.g., E911), gaming services, instant messaging services, presence services, video conferencing services, social networking and sharing services, location-based services, push-to-talk services, and so on. In order to access these services (e.g., telephony services), a UE is configured to request establishment of a communication session. In the case of telephony services, the communication session can comprise a call (i.e., a voice-based communication session, such as a VoLTE call, or a Wi-Fi call).

The UE 102 is also configured to utilize various radio access networks (RANs) in order to access the IMS core. In general, the IMS core is agnostic to the access technology that is used to connect a UE to the IMS core. In this manner, the UE 102 can connect to the IMS core via a 3GPP RAN, such a GSM/EDGE RAN (GERAN), a Universal Terrestrial RAN (UTRAN), or an evolved UTRAN (E-UTRAN), or alternatively, via a "non-3GPP" RAN, such as a Wi-Fi RAN, or another type of wireless local area network (WLAN) that is based on the IEEE 802.11 standards. Accessing the IMS core through a Wi-Fi access network typically involves the UE 102 communicating with the IMS core through a Wi-Fi access point (AP). Providing access to the IMS core through non-3GPP RANs has opened the door to recent advancements in IMS-based services, such as the introduction of Wi-Fi calling, which allows users to initiate and receive calls over an available Wi-Fi AP.

When a user of the UE 102 wishes to initiate a communication, the UE 102 can transmit an INVITE command 108 which can be received by the capability server(s) 104 and transmitted as the INVITE command 110 to the UE 106. In this example, the UE 102 can be referred to as an initiating UE, and the UE 106 can be referred to as a destination UE. In some instances, as discussed herein, the INVITE command 108 can include a request for capability information from the UE 102. Further, in some instances, the capability server 104 can analyze or parse the INVITE command 108 to identify the request for capability information, and can further determine whether the network allows such a request to be made of the UE 106. In some instances, the capability server 104 can pass the request for capability information to the UE 106, can refuse the request, and/or can provide an indication of the acceptable discovery method to the UE 102, for example.

The UE 106 can receive the INVITE command 110, and in response to the INVITE command 110 from the UE 102, the UE 106 can provide a capability exchange 112 including capability information illustrated as capability(1), capability (2), . . . , capability(N). That is, in response to receiving a request (e.g., the INVITE command 110) associated with a particular communication type (e.g., one of a voice call, video call, SMS message, RCS message, RTT message, etc.), the UE 106 can provide a detailed list of capability information to the UE 102.

In some instances, the capability exchange 112 can include capability information including, but not limited to, one or more of: voice call capability; video call capability; rich communication services (RCS) capability; real time text (RTT) capability; short message service/multimedia messaging service (SMS/MMS) capability; encryption capability; codec capability; display characteristics (e.g., size, resolution, gamut, etc.); device state (e.g., available memory, processor speed, processor availability, battery status, SIM information, IMEI number, etc.); address information (e.g., IP address, MAC address, physical device location, etc.), installed applications; connection strength (e.g., received signal strength indication (RSSI)); connection type (e.g., wired/wireless); connection protocol (e.g., Wi-Fi, 4G, 5G, etc.); and the like. Thus, capability information for a plurality of features can be determined in parallel with establishing a communication between an initiating UE and a destination UE.

As the capability exchange 112 is received by the user equipment 102, as an update event 114, the user equipment 102 can update capability information associated with the UE 106. In some instances, the update event 114 can update a databased stored on or in connection with the user equipment 102, such as in a database that is local to the UE 102. In some instances, the capability exchange 112 can be provided to the capability server 104 as well as the UE 102, so that the capability information can be provided to other UEs in a publish and subscribe manner, as discussed herein.

Further, the example signaling 100 can include signaling to establish the communication session, to conduct the communication session, and/or to terminate the communication session. In some instances, the capability exchange from the UE 106 to the UE 102 may not occur until the UE 106 has accepted the INVITE command 110 to establish a communication session. As discussed above, the example signaling 100 can include the UE 102 exchanging capability information with the capability server 104 and/or the UE 106.

Figure 1B:
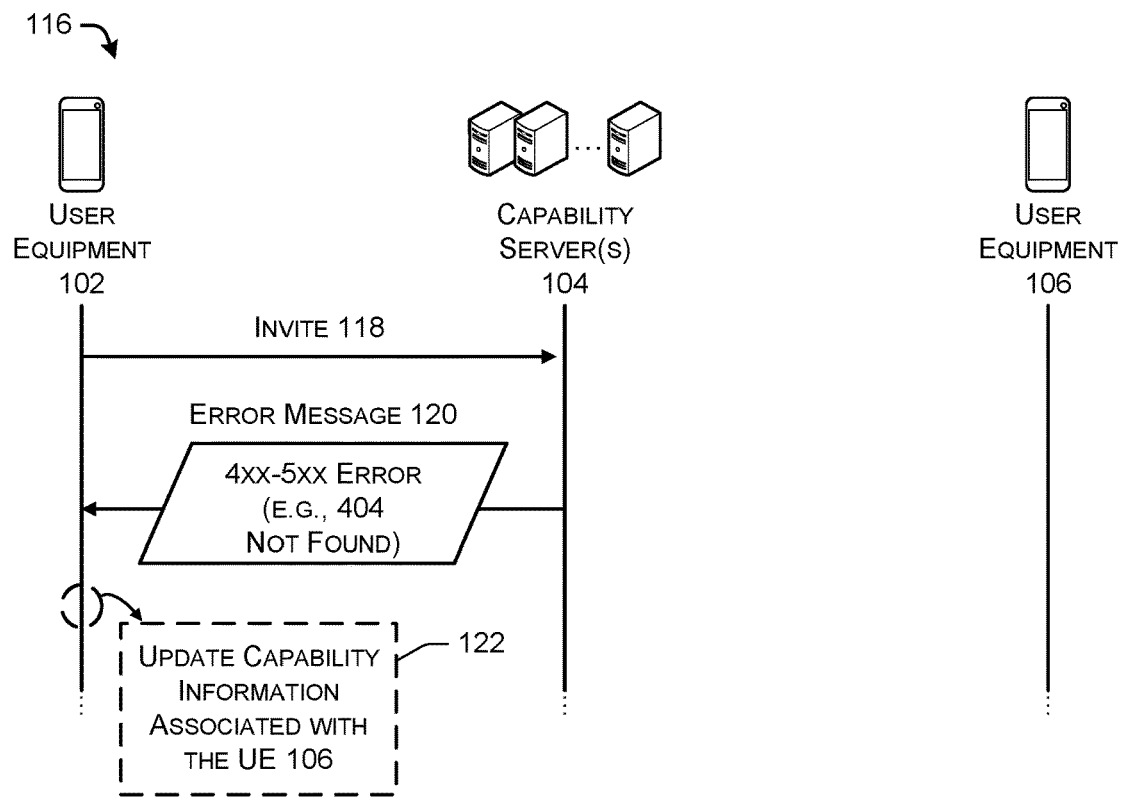
FIG. 1B is a diagram illustrating example signaling involving a user equipment (UE), a capability server, and a UE, and updating capability information based at least in part on an error message received by at least one UE.

FIG. 1B is a diagram illustrating example signaling 116 involving the user equipment (UE) 102, the capability server 104, and the UE 106, and updating capability information based at least in part on an error message received by the UE 102.

For example, the UE 102 can transmit an INVITE command 118 to the capability server 104, with the ultimate destination of the INVITE command 118 corresponding to the UE 106. In some instances, the UE 106 can be unavailable (e.g., not visible to the network, such as underground or in a building), and the capability server 104 can receive the INVITE command 118 and provide an error message 120 at least partially in response to the INVITE command 118 and an indication that the UE 106 is not available. In some instances, for example, when the UE 106 is not found, when there is an error reaching the UE 106, or when the UE 106 is otherwise unavailable, the capability server 104 can function as an originating/terminating network node to provide signaling to other devices. In some examples, the error message 120 can include an HTTP 4xx-5xx error message, such as HTTP 404, Not Found. As understood in the context of this disclosure, the error message 120 can include any level of detail regarding the state of the UE 106, such as the most recent capability information, the time of last contact, historical access information (e.g., indicating whether the 404 error is to be expected based on usage patterns, etc.), and the like. In some instances, the error message 120 can include any error message, and is not limited to HTTP 4xx-5xx error messages.

At least partially in response to receiving the error message 120 at the UE 102, an update event 122 can update capability information associated with the UE 106. That is, the UE 102 can determine that if the UE 102 receives the error message 120 in response to initiating a voice communication (e.g., as the INVITE command 118), the UE 106 is likely not capable of voice calls and video calls, based at least in part on the error message 120.

In some instances, the UE 102 can transmit the INVITE command 118 again until a threshold number of times is reached before updating the capability information associated with the UE 106. In some instances, a metric can be associated with the update event 122 indicating an amount of time elapsed from the update event 122, which can inform the UE 102 and/or the capability server 104 of a staleness of the capability information or a likelihood (e.g., a confidence level) that the capability information is accurate over time. Thus, a lack of information (in the form of the error message 120) can be used to inform the UE 102 and/or the capability server 104 of the capability information of the UE 106.

Figure 2:
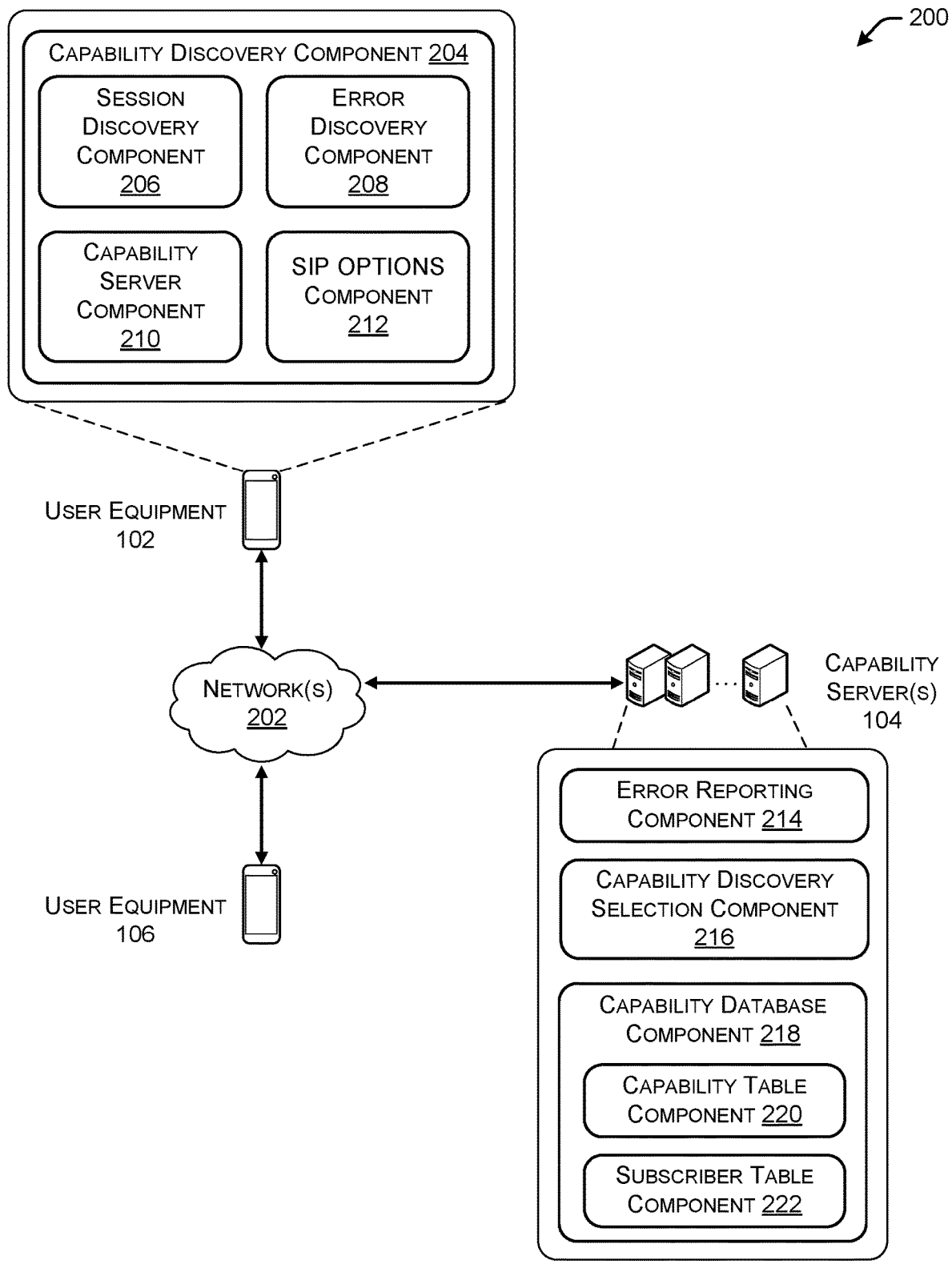
FIG. 2 illustrates an example environment including user equipment and capability server(s) implementing various capability discovery methods, as described herein.

FIG. 2 illustrates an example environment 200 including user equipment and capability server(s) implementing various capability discovery methods, as described herein. For example, the environment 200 can include the user equipment (UE) 102 as an initiating UE, the capability server(s) 104, and the UE 106 as the destination UE. However, it can be understood that the environment 200 can include any number of user equipment and/or network devices.

The UE 102, the capability server 104, and the UE 106 can be communicatively coupled via one or more networks 202.

As can be understood in the context of this disclosure, the UE 102, the capability server 104, and the UE 106 can implement the signaling as illustrated in FIGS. 1A and 1B, as well as other features, as discussed herein. For example, the UE 102 can include a capability discovery component 204 including a session discovery component 206, an error discovery component 208, a capability server component 210, and a SIP OPTIONS component 212. Further, the capability server(s) 104 can include an error reporting component 214, a capability discovery selection component 216, and a capability database component 218 including a capability table component 220 and a subscriber table component 222.

In general, the capability discovery component 204 of the UE 102 includes functionality to implement a plurality of capability service methods. For example, the capability discovery component 204 can select a discovery method based at least in part on an indication from the capability server 104 or otherwise based up on an indication from the network 202. In some instances, the capability discovery component 204 can utilize a default discovery method, can utilize a plurality of methods in parallel, and/or can utilize a method based on a selection indication, as discussed herein.

The session discovery component 206 includes functionality to request capability information from a UE and/or provide capability information to another UE in connection with establishing a communication session with a UE. For example, as discussed in connection with FIGS. 1A and 1B, the initiating UE 102 can initiate a communication session with the destination UE 106. In connection with the communication session signaling, the session discovery component 206 can transmit a request for capability information to the UE 106, and in some instances, the session discovery component 206 can transmit capability information associated with the UE 102 to the UE 106. In some instances, a request for capability information from the session discovery component 206 can specifically request capability information with respect to particular features (e.g., voice call, video call, RCS, RTT, SMS, MIMS, etc.) and in some instances, the request can include a request for any capability information the UE 106 can provide. As may be understood, the session discovery component 206 is not necessarily limited to session-based communications, and can provide functionality to transaction-based communications (e.g., SMS/MMS over IMS, etc.).

The error discovery component 208 includes functionality to receive an error message associated with the destination UE (e.g., the UE 106) and to update capability information associated with the destination UE. For example, as discussed above with respect to FIG. 1B, the UE 102 can transmit an INVITE command 118 and/or a request for capability information, with the UE 106 as the ultimate destination. The capability server 104 can receive the INVITE command 118 and/or the request for capability information and can transmit an error message (e.g., the error message 120) to the UE 102 in response to the request. The error discovery component 208 can determine, based at least in part on information included in the error message, one or more capabilities of the destination UE. Further, updating the capability information can be further based at least in part on the initial request. In one example, if the INVITE command (e.g., the INVITE command 118) corresponds to a voice communication session, an error message received in response to this command can be interpreted by the error discovery component 208 such that capabilities of voice and video are unavailable at the destination UE. In another example, if the INVITE command corresponds to a video communication session, an error message received in response to this command can be interpreted by the error discovery component 208 such that video capabilities can be unavailable, but voice capability can be unknown. Of course, these examples are not intended to be limiting, and the error discovery component 208 can determine capability information based on the error message(s) in any manner.

The capability server component 210 includes functionality to interface with a capability server as a central repository for capability information associated with UEs. For example, the capability server component 210 can publish capability information associated with the UE 102 to a capability server (e.g., the capability server 104), and/or can subscribe to receive capability information updates associated with other UEs, such as the UE 106. In some instances, the capability server component 210 can publish and/or subscribe to capability information updates in parallel with the discovery methods discussed herein. In some instances, the capability server component 210 can be selected to operate based on an indication from the capability server 104 or otherwise received from the network 202.

The SIP OPTIONS component 212 includes functionality to send a SIP OPTIONS request and/or to receive a response based at least in part on the command. For example, the SIP OPTIONS component 212 can construct an OPTIONS request to discover a capability of a destination device, for example. In some instances, the OPTIONS request can be sent prior to sending the INVITE command (e.g., the INVITE commands 108 and 118), as discussed herein, to determine a state of a destination device. As discussed herein, the SIP OPTIONS component 212 can operate in parallel with other discovery methods discussed herein, and/or can be selected based at least in part on receiving an instruction from the capability server 104 or otherwise received from the network 202.

In general, the capability server(s) 104 includes functionality to facilitate communications in an IMS network, as described above, and includes functionality to facilitate device capability discovery amongst the various devices coupled to the network 202. For example, the capability server(s) 104 can comprise an IMS network to initiate communications, conduct communications, and terminate communications. Further, the capability server(s) 104 can transmit and receive capability exchange requests and capability information, transmit and receive error messages, coordinate publish and subscribe capability discovery methods, and support SIP OPTIONS requests. These and other aspects of the capability server(s) 104 are discussed herein.

The error reporting component 214 includes functionality to receive a request for a communication (e.g., an INVITE command), determine that a destination UE is not available, and provide an error message to an initiating UE, for example. In some instances, the error reporting component 214 can access a table or database associated with a state of the destination UE to determine that the destination UE is not available, and can transmit the error message based at least in part on this determination. In some instances, the error message can include an HTTP 4xx-5xx error message, for example, detailing that a destination UE is not found.

The capability discovery selection component 216 includes functionality to instruct one or more UEs to select a discovery method for use in connection with operation of the UE on the network 202, for example. In some instances, the capability discovery selection component 216 can receive a first type of request for capability information, can determine that the first type of request in not supported by the network 202, and can instruct a UE to utilize a second type of request to determine capability information on the network 202. In some instances, the capability discovery selection component 216 can receive a query from a UE inquiring about the proper form of a capability request, and can respond with the discovery method(s) supported by the network 202.

In general, the capability database component 218 includes functionality to facilitate publish and subscribe discovery methods for determining a capability of user equipment. For example, the capability database component 218 can transmit one or more requests to UEs to request capability information, and can receive capability information published by individual UEs. In some instances, the capability database component 218 can receive requests from UEs to subscribe to capability information associated with other UEs. In some instances, the capability database component 218 can push capability information to UEs based on subscription indication(s), and in some instances the capability database component 218 can provide capability information in response to a request for such capability information.

The capability table component 220 includes functionality to store capability information received from UE(s), to associate the capability information with a user profile or a device identifier associated with the individual UEs, and to provide the capability information upon request by other UEs, or in response to changes in the capability information.

The subscriber table component 222 includes functionality to receive subscriber requests from UEs subscribing to capability information associated with other UEs, and to provide capability information upon receiving requests and/ or in response to change(s) in the capability information.

Figure 3:
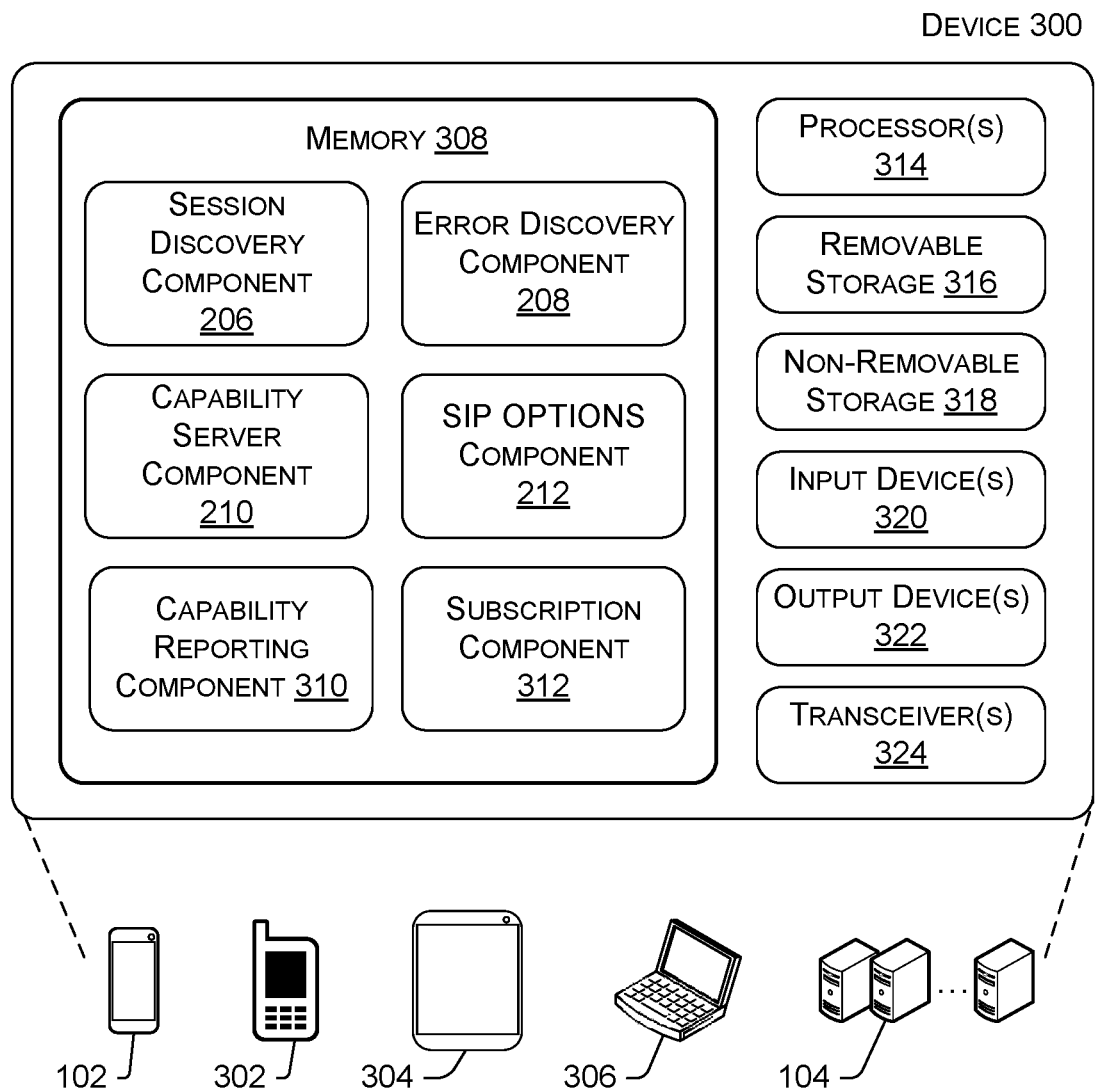
FIG. 3 illustrates an example device, such as a user equipment and/or capability server(s), to implement the device service capability discovery, as described herein.

FIG. 3 illustrates an example device 300, such as a user equipment and/or capability server(s), to implement the device service capability discovery techniques, as discussed herein. In some embodiments, the device 300 can correspond to the UEs 102 or 106, or the capability server 104. In any event, some or all of the components illustrated in FIG. 2 can be implemented in the device 300. Further, the device 300 can be implemented as any one of a smartphone 302, a tablet computer 304, a laptop computer 306, and the like. It is to be understood in the context of this disclosure that the device 300 can be implemented as a single device or as a plurality of devices with components and data distributed among them.

As illustrated, the device 300 comprises a memory 308 storing the session discovery component 206, the error discovery component 208, the capability server component 210, the SIP OPTIONS component 212, a capability reporting component 310, and a subscription component 312 to provide functionality to the device 300 to discover capabilities of network devices, as described herein. In some instances, such as when the device 300 is implemented as the capability server 104, the memory 308 can further include components and data including, but not limited to, the error reporting component 214, the capability discovery selection component 216, the capability database component 218, the capability table component 220, and/or the subscriber table component 222 to discover capabilities of network devices, as described herein. Also, the device 300 includes processor(s) 314, a removable storage 316 and non-removable storage 318, input device(s) 320, output device(s) 322, and transceiver(s) 324.

Details of the session discovery component 206, the error discovery component 208, the capability server component 210, and the SIP OPTIONS component 212 are discussed above with respect to FIG. 2.

In some embodiments, the capability reporting component 310 can include functionality to receive a request for a capability exchange and report capabilities of a UE to a requesting device. For example, in the context of FIG. 1A, the UE 102 can transmit a request for a capability exchange to the UE 106 (either as included in the INVITE command 108 or as a stand-alone command, for example). The capability reporting component 310 associated with the UE 106 can receive the request for the capability exchange and can respond to the request with capability information associated with the UE 106. As can be understood in the context of this disclosure, the UE 102 can also have a capability reporting component 310 to provide capability information associated with the UE 102 to the UE 106. In some instances, the capability reporting component 310 can provide capability information to a centralized repository (e.g., the capability server 104) in a publish and subscribe discovery model, as discussed herein.

In some embodiments, the subscription component 312 can include functionality to subscribe to capability information associated with various UEs, as discussed herein. In some cases, the subscription component 312 can transmit a request to the capability server 104, for example, to subscribe to capability information updates associated with various UEs. Thus, the subscription component 312 can receive capability information based at least in part on subscription information provided to a centralized server, such as the capability server 104.

In various embodiments, the memory 308 is volatile (such as RAM), non-volatile (such as ROM, flash memory, etc.) or some combination of the two. The session discovery component 206, the error discovery component 208, the capability server component 210, the SIP OPTIONS component 212, the capability reporting component 310, and the subscription component 312 stored in the memory 308 can comprise methods, threads, processes, applications or any other sort of executable instructions. The session discovery component 206, the error discovery component 208, the capability server component 210, the SIP OPTIONS component 212, the capability reporting component 310, and the subscription component 312 can also include files and databases.

In some embodiments, the processor(s) 314 is a central processing unit (CPU), a graphics processing unit (GPU), or both CPU and GPU, or other processing unit or component known in the art.

The device 300 also includes additional data storage devices (removable and/or non-removable) such as, for example, magnetic disks, optical disks, or tape. Such additional storage is illustrated in FIG. 3 by removable storage 316 and non-removable storage 318. Tangible computer-readable media can include volatile and nonvolatile, removable and non-removable media implemented in any method or technology for storage of information, such as computer readable instructions, data structures, program modules, or other data. Memory 308, removable storage 316 and non-removable storage 318 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 300. Any such tangible computer-readable media can be part of the device 300.

The device 300 also can include input device(s) 320, such as a keypad, a cursor control, a touch-sensitive display, voice input device, etc., and output device(s) 322 such as a display, speakers, printers, etc. These devices are well known in the art and need not be discussed at length here.

As illustrated in FIG. 3, the device 300 also includes one or more wired or wireless transceiver(s) 324. For example, the transceiver(s) 324 can include a network interface card (NIC), a network adapter, a LAN adapter, or a physical, virtual, or logical address to connect to the network 202, for example, or the various user devices and servers. To increase throughput when exchanging wireless data, the transceivers 324 can utilize multiple-input/multiple-output (MIMO) technology. The transceiver(s) 324 can comprise any sort of wireless transceivers capable of engaging in wireless, radio frequency (RF) communication. The transceivers 324 can also include other wireless modems, such as a modem for engaging in Wi-Fi, WiMAX, Bluetooth, or infrared communication.

Figure 4:
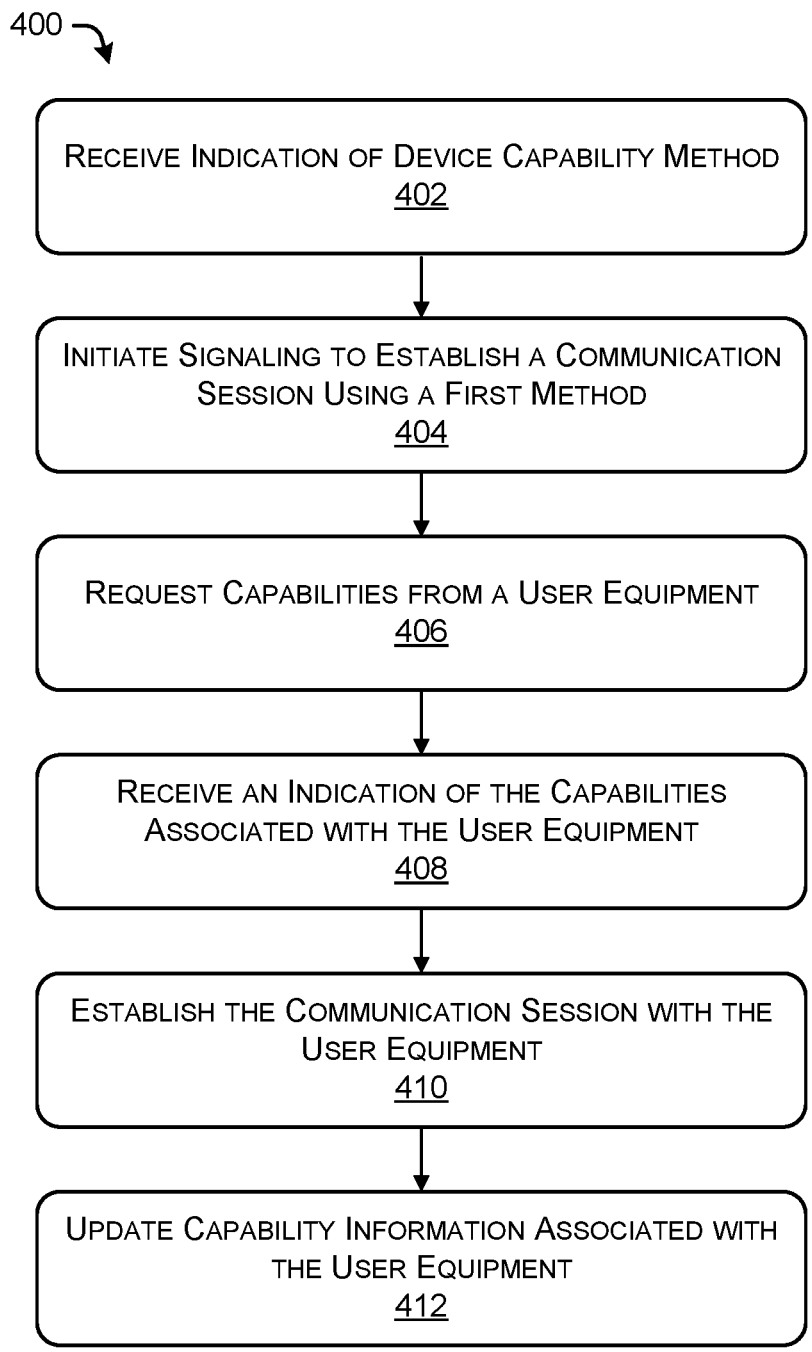
FIG. 4 illustrates an example process for discovering capabilities of user equipment in a network and for facilitating a communication.
Figure 5:
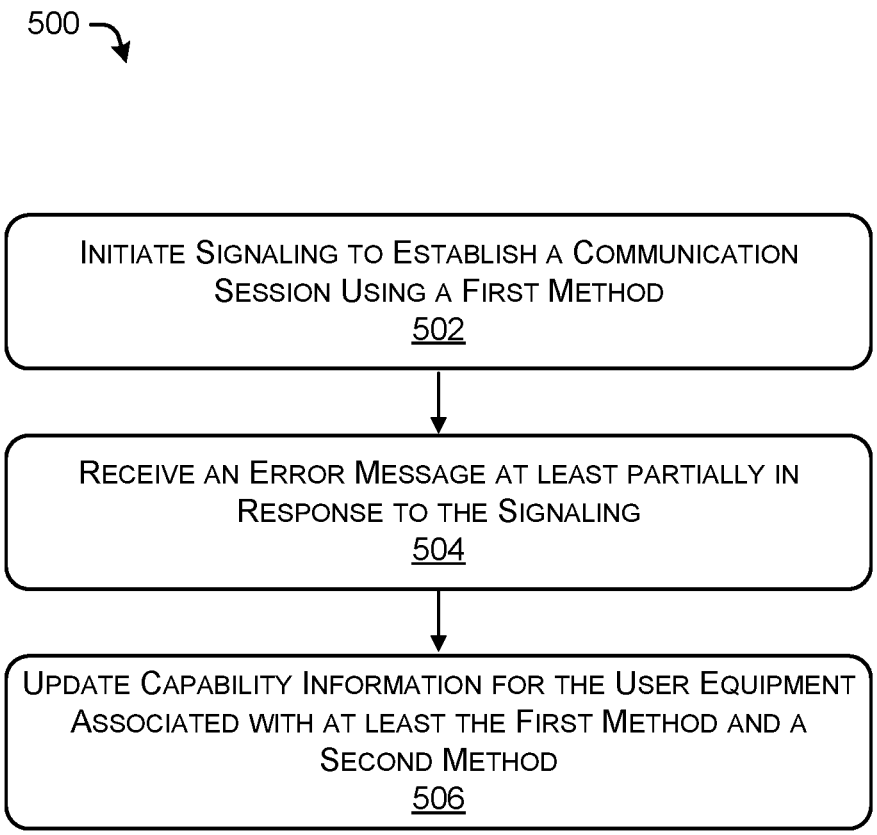
FIG. 5 illustrates an example process for discovering capabilities of user equipment in a network based at least in part on an error message.
Figure 6:
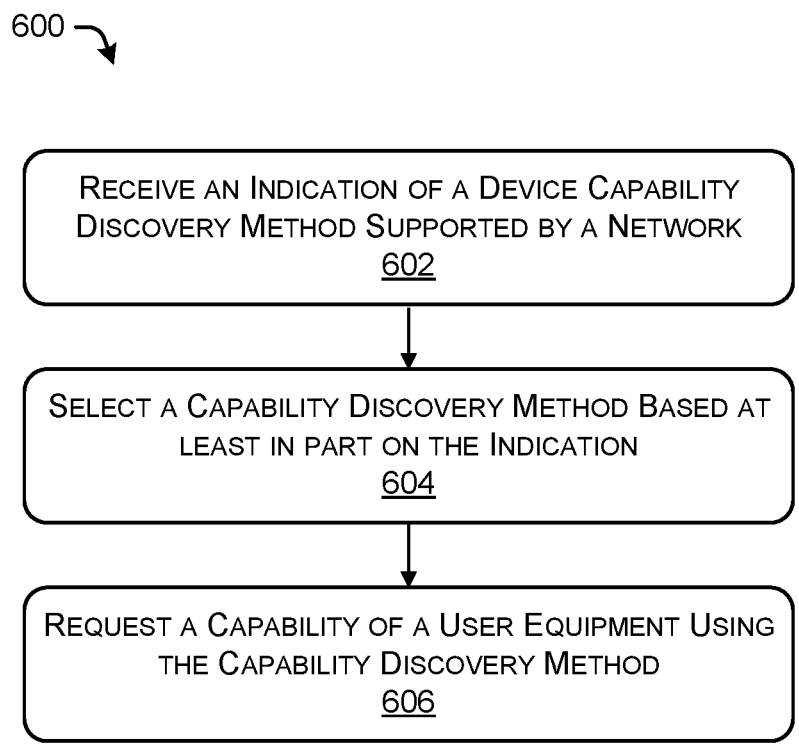
FIG. 6 illustrates an example process for selecting a capability discovery method.

FIGS. 4-6 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process 400 for discovering capabilities of user equipment in a network and for facilitating a communication. The example process 400 can be performed by the UEs 102 and 106, the capability server 104, or the device 300, for example. Some or all of the process 400 can be performed by one or more devices in the environment 200, for example.

At operation 402, the process can include receiving an indication of a device capability method to be utilized for determining device capabilities of network devices. For example, the operation 402 can include a UE (e.g., the UE 102) querying a device (e.g., an IMS node, such as the capability server 104) in a network (e.g., the network 202) requesting information or an indication associated with the device discovery method supported by the network. In some instances, the device can provide the indication to the UE regarding the device capability method supported by the network. In some instances, the operation 402 can include utilizing a default discovery method until otherwise receiving an indication that another method is to be used. In some instances, the operation 402 can include utilizing a plurality of discovery methods, in parallel or in series (e.g., cycling through methods to determine which method is accepted by the network). In some instances, the operation 402 includes storing an indication of the device capability method in a memory of the UE, for example.

At operation 404, the process can include initiating signaling to establish a communication session using a first method. For example, and as discussed above in connection with FIGS. 1A and 1B, the operation 404 can include transmitting an INVITE command from an initiating UE to an ultimate destination of a destination UE. In some instances, the operation 404 can include routing signaling through one or more intermediary devices, such as IMS nodes of a network. As can be understood, the signaling to establish a communication can be in accordance with SIP (session initiation protocol) procedures. In another embodiment, the operation 404 can include receiving a selection of the communication session to be utilized by the UE. For example, the UE can receive selection of an application or function operating on the UE to indicate a type of communication session (e.g., voice, video, RCS, RTT, SMS, MIMS, etc.) to be initiated. In some instances, the operation 404 can include presenting, on a user interface of a UE, last known capability information associated with a destination UE.

At operation 406, the process can include requesting capabilities from a user equipment. For example, the operation 406 can include the initiating UE transmitting a request to the destination UE to request capability information from the destination UE. In some instances, the INVITE command (e.g., discussed in the operation 404) can include the request for capability information. In some instances, the operation 406 can include receiving a confirmation of an acceptance of the communication session from the destination UE, and at least partially in response, requesting additional capabilities of the destination UE. In some instances, the operation 406 can include determining that a bandwidth of network traffic associated with the communication session is below a threshold value before requesting the capability information from the destination UE. In some instances, the operation 406 can include transmitting capability information associated with the initiating UE to the destination UE, with the transmission occurring at least in part on ongoing signaling procedures to establish the communication session.

At operation 408, the process can include receiving an indication of the capabilities associated with the user equipment. For example, the operation 408 can include receiving capability information associated with some or all of the capabilities of the destination UE, in addition to the capabilities implicated in the communication session to be established. That is to say, in a case where the communication session utilizes a first group of capabilities and/or resources of the destination UE, the destination UE can provide capability information associated with a second group of capabilities that includes capabilities in addition to those associated with the first group of capabilities. By way of example, if a communication session is a voice call, the capability information provided in response can include capability information associated with one or more of a voice call, video call, RCS, RTT, SMS, MIMS, etc.

At operation 410, the process can include establishing the communication session with the user equipment. For example, the operation 410 can include completing signaling processes to establish the communication, such as acknowledging the INVITE command, transmitting communication information, etc.

At operation 412, the process can include updating capability information associated with the user equipment. For example, the operation 412 can include receiving the capability information from the destination UE, and as an update event, updating a database within the initiating UE including capability information associated with the destination UE. In some examples, the operation 412 can include comparing received capability information with stored capability information to determine if there are any changes or differences between the information, and updating information that has changed. In some instances, the operation 412 can include updating a user interface on an initiating UE to illustrate or represent the capabilities of the destination UE. In some examples, the operation 412 can include updating an address book, icons, colorization, visualizations, applications, etc. of the initiating UE to illustrate the capabilities of the destination UE. Further, in some cases, the operation 412 can include transmitting at least a portion of the capability information for storage at a central repository, such as the capability server 104.

FIG. 5 illustrates an example process 500 for discovering capabilities of user equipment in a network based on an error message. The example process 500 can be performed by the UEs 102 and 106, the capability server 104, or the device 300, for example. Some or all of the process 500 can be performed by one or more devices in the environment 200, for example.

At operation 502, the process can include initiating signaling to establish a communication session using a first method. For example, the operation 502 can include initiating signaling to establish a communication session for one of a: voice call session; video call session; RCS session; RTT session; SMS/MMS session; an application specific communication session; or the like. For example, the operation 502 can include transmitting an INVITE command, and/or transmitting any commands in accordance with protocols associated with individual communication sessions. In some instances, the operation 502 can include an initiating UE initiating signaling, with a destination UE as the ultimate destination for the signaling, although in some instances, the signaling can be routed through any number of intermediary devices, such as various IMS nodes.

At operation 504, the process can include receiving an error message at least partially in response to the signaling. For example, the operation 504 can include receiving one or more error messages from an IMS node (e.g., the capability server 104) indicating an error associated with the destination UE. For example, the destination UE can be unavailable or otherwise not reachable, in which case, the capability server 104 can provide an HTTP 404 error to the initiating UE in response to the signaling. As can be understood in the context of this disclosure, the error message can include, but is not limited to, one or more of HTTP 4xx-5xx messages. Further, the error message can include information regarding the last known capability information associated with the destination UE, time elapsed since last contacting the destination UE, etc.

At operation 506, the process can include updating capability information for the user equipment associated with at least the first method and a second method. For example, the first method can correspond to the first method associated with the signaling represented in the operation 502, and the second method can correspond to additional functions of the destination UE. In some cases, the operation 506 can include determining, based on an error message associated with the first method, a confidence level that capabilities associated with the second method are also unavailable. Thus, the operation 506 can include inferring or determining that a plurality of functions is unavailable when receiving an error message in response to a single function or a subset of functions of the plurality of functions. Further, the operation 506 can include determining whether a threshold number of attempts have been made to establish the communication using the first method and/or the second method. For example, upon receiving an error message in response to initiating signaling for a first communication session, the process 500 can include initiating signaling again to receive a second error message. Upon receiving a threshold number of error messages, the process 500 can update the capability information and/or initiate signaling for another method, in which case, the process 500 can include receiving additional error messages, which can additionally be used to update capability information, as discussed herein.

FIG. 6 illustrates an example process 600 for selecting a capability discovery method. The example process 600 can be performed by the UEs 102 and 106, the capability server 104, or the device 300, for example. Some or all of the process 600 can be performed by one or more devices in the environment 200, for example.

At operation 602, the process can include receiving an indication of a device capability discovery method supported by a network. For example, the operation 602 can include an initiating device powering on or otherwise connecting to a network and receiving information from an IMS node of the network regarding one or more supported device capability discovery methods. In some examples, the operation 602 can include requesting capability information using a first method and receiving an error message that the device capability discovery method is not supported by the network. In some instances, the operation 602 can include receiving an indication that a plurality of methods are supported in parallel, or a preferred order of selecting a device capability discovery method.

At operation 604, the process can include selecting a capability discovery method based at least in part on the indication. For example, in some cases, the operation 602 can indicate that a plurality of discovery methods are supported, in which case, the operation can include selecting one of many acceptable methods. In other examples, the indication can indicate one method for capability discovery, in which case, that method can be used to obtain capability information, as discussed herein.

At operation 606, the process can include requesting a capability of user equipment using the capability discovery method. For example, the operation 606 can include performing the device capability discovery techniques, as discussed herein.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors;
a memory; and
one or more components stored in the memory and executable by the one or more processors to perform operations comprising:
initiating, by an initiating user equipment, signaling to establish a communication session using a first communication method;
transmitting a request for capability exchange associated with a destination user equipment, the request addressed to the destination user equipment;
receiving an indication of capabilities associated with the destination user equipment, the indication including at least first capabilities associated with the first communication method and second capabilities associated with a second communication method;

establishing the communication session between the initiating user equipment and the destination user equipment;

updating a database on the initiating user equipment, the database including capability information corresponding to the capabilities associated with the destination user equipment;

retrieving, by the initiating user equipment, the capability information corresponding to the capabilities associated with the destination user equipment from the database;

rendering to a display of the initiating user equipment, by the initiating user equipment, indicia of the retrieved capability information; and after the rendering, receiving, by the initiating user equipment, an input selecting one of the communication methods associated with a respective one of the capabilities corresponding to at least a part of the indicia of the capability information.

2. The system of claim 1, wherein the indication is a first indication, the operations further comprising transmitting, to the destination user equipment, a second indication of third capabilities associated with the initiating user equipment, the second indication including at least the first capabilities associated with the first communication method and the second capabilities associated with the second communication method.

3. The system of claim 1, the operations further comprising:

receiving, at the initiating user equipment, a response to the signaling to establish the communication session; and transmitting the request for the capability exchange at least partially in response to the response to the signaling to establish the communication session.

4. The system of claim 1, wherein the first communication method is a voice communication and the second communication method is a video communication, and wherein the first capabilities are associated with the destination user equipment being capable of transmitting and receiving the voice communication, and wherein the second capabilities are associated with the destination user equipment being capable of transmitting and receiving the video communication.

5. A first user equipment comprising:
one or more processors;
a display;
a memory; and
one or more components stored in the memory and executable by the one or more processors to perform operations comprising:
initiating, by the first user equipment, signaling to establish a communication session;
transmitting a request for capability exchange associated with a second user equipment, the request addressed to the second user equipment;
receiving an indication of capabilities associated with the second user equipment;
updating, at a database of the first user equipment, capability information associated with the second user equipment, the capability information corresponding to the capabilities specified in the received indication of capabilities;

retrieving the capability information corresponding to the capabilities associated with the second user equipment from the database;

rendering to the display indicia of the retrieved capability information; and after the rendering, receiving an input selecting a communication method associated with a respective one of the capabilities corresponding to at least a part of the indicia of the capability information.

6. The first user equipment of claim 5, wherein the indication includes the capability information associated with the second user equipment, and wherein the indication is transmitted by the second user equipment to the first user equipment.

7. The first user equipment of claim 6, wherein the communication session is associated with a first communication method, and wherein the indication includes the capability information including a first capability associated with the first communication method and a second capability associated with a second communication method.

8. The first user equipment of claim 7, wherein the first capability is a voice capability, and wherein the second capability includes at least one of a video capability, a rich communication services (RCS) capability, a real time text (RTT) capability, and a short message service/multimedia messaging service (SMS/MMS) capability.

9. The first user equipment of claim 5, wherein the indication includes an error message associated with the second user equipment, and wherein the indication is transmitted by a capability server to the first user equipment.

10. The first user equipment of claim 9, wherein the request is a first request, and wherein the error message is a first error message, the operations further comprising:

determining that a first number of received error messages is below a threshold value;

transmitting a second request for the capability exchange associated with the second user equipment;

receiving a second error message at least partially in response to the second request; and determining that a second number of received error messages meets the threshold value, wherein updating the capability information associated with the second user equipment is based at least in part on the second number of received error messages meeting the threshold value.

11. The first user equipment of claim 9, wherein the error message is a HTTP 404 error message.

12. The first user equipment of claim 5, wherein the capability information is first capability information, the operations further comprising transmitting, by the first user equipment, second capability information corresponding to communication capabilities of the first user equipment prior to the receiving the indication of the capabilities associated with the second user equipment.

13. The first user equipment of claim 5, wherein the capability information is first capability information, the operations further comprising transmitting, by the first user equipment, second capability information corresponding to communication capabilities of the first user equipment, wherein the transmitting the capability information is performed at least partially in response to the receiving the indication of the capabilities associated with the second user equipment.

14. The first user equipment of claim 5, wherein the indication is a first indication, the operations further comprising:

receiving a second indication of a device capability discovery method supported by a network; and transmitting the request for the capability exchange based at least in part on the second indication of the device capability discovery method.

15. A processor-implemented method comprising:

initiating, by a first user equipment, signaling to establish a communication session;

transmitting a request for capability exchange associated with a second user equipment, the request addressed to the second user equipment;

receiving an indication of capabilities associated with the second user equipment; and updating, at a database of the first user equipment, capability information associated with the second user equipment, the capability information corresponding to the capabilities specified in the received indication of capabilities;

retrieving the capability information corresponding to the capabilities associated with the second user equipment from the database;

rendering to the display indicia of the retrieved capability information; and after the rendering, receiving an input selecting a communication method associated with a respective one of the capabilities corresponding to at least a part of the indicia of the capability information.

16. The processor-implemented method of claim 15, wherein the indication includes the capability information associated with the second user equipment, and wherein the indication is transmitted by the second user equipment to the first user equipment.

17. The processor-implemented method of claim 16, wherein the communication session is associated with a first communication method, and wherein the indication includes the capability information including a first capability associated with the first communication method and a second capability associated with a second communication method.

18. The processor-implemented method of claim 15, wherein the indication includes an error message associated with the second user equipment, and wherein the indication is transmitted by a capability server to the first user equipment.

19. The processor-implemented method of claim 18, wherein the request is a first request, and wherein the error message is a first error message, the processor-implemented method further comprising:

determining that a first number of received error messages is below a threshold value;

transmitting a second request for the capability exchange associated with the second user equipment;

receiving a second error message at least partially in response to the second request; and determining that a second number of received error messages meets the threshold value, wherein updating the capability information associated with the second user equipment is based at least in part on the second number of received error messages meeting the threshold value.

20. The processor-implemented method of claim 15, wherein the capability information is first capability information, the processor-implemented method further comprising transmitting, by the first user equipment, second capability information corresponding to communication capabilities of the first user equipment, wherein the transmitting the capability information is performed at least partially in response to the receiving the indication of the capabilities associated with the second user equipment.

* * * * *